US011394583B2

(12) United States Patent
Guo et al.

(10) Patent No.: US 11,394,583 B2
(45) Date of Patent: Jul. 19, 2022

(54) ETHERNET INTERCONNECTION CIRCUIT AND APPARATUS

(71) Applicant: SHENZHEN TATFOOK WISDOM HEALTH TECHNOLOGY CO., LTD., Shenzhen (CN)

(72) Inventors: Rui Guo, Shenzhen (CN); Shouqiang Yao, Shenzhen (CN)

(73) Assignee: SHENZHEN TATFOOK WISDOM HEALTH TECHNOLOGY CO., LTD., Shenzhen (CN)

( * ) Notice: Subject to any disclaimer, the term of this patent is extended or adjusted under 35 U.S.C. 154(b) by 111 days.

(21) Appl. No.: 16/930,274

(22) Filed: Jul. 15, 2020

(65) Prior Publication Data

US 2020/0351121 A1 Nov. 5, 2020

Related U.S. Application Data

(63) Continuation of application No. PCT/CN2017/077767, filed on Mar. 22, 2017.

(51) Int. Cl.
*H04L 12/50* (2006.01)
*G06F 13/40* (2006.01)
*H04L 12/46* (2006.01)

(52) U.S. Cl.
CPC .......... *H04L 12/50* (2013.01); *G06F 13/4022* (2013.01); *H04L 12/46* (2013.01); *G06F 2211/005* (2013.01)

(58) Field of Classification Search
None
See application file for complete search history.

(56) References Cited

U.S. PATENT DOCUMENTS

| 6,215,816 B1 * | 4/2001 | Gillespie | H04L 12/44 375/220 |
| 2008/0155157 A1 * | 6/2008 | Lee | H04L 49/30 710/301 |

(Continued)

FOREIGN PATENT DOCUMENTS

| CN | 101815103 A | 8/2010 |
| CN | 102185753 A | 9/2011 |

(Continued)

OTHER PUBLICATIONS

International Search Report and Written Opinion for related International application No. PCT/CN2017/077767, dated Aug. 23, 2017 (10 pages).

(Continued)

*Primary Examiner* — Walter J Divito (57) ABSTRACT

Disclosed are an Ethernet interconnection circuit and apparatus. A physical interface exchanger of the circuit has a first physical interface, a second physical interface and a third physical interface, wherein a first board-level processor realizes communication between the first board-level processor and an external Ethernet by means of the first physical interface, the third physical interface, and a network interface connected to the third physical interface; a second board-level processor realizes communication between the second board-level processor and the external Ethernet by means of the second physical interface, the third physical interface, and the network interface connected to the third physical interface; and the first-board-level processor and the second-board-level processor realize communication between the first board-level processor and the second-board-level processor by means of the first physical interface and the second physical interface.

16 Claims, 6 Drawing Sheets

(56) References Cited

U.S. PATENT DOCUMENTS

| | | | |
|---|---|---|---|
| 2013/0215911 A1* | 8/2013 | Chengson | H04L 7/0008 370/503 |
| 2016/0118121 A1* | 4/2016 | Kelly | G06F 13/4282 710/301 |
| 2016/0301544 A1 | 10/2016 | Zinner | |
| 2017/0048103 A1* | 2/2017 | Azuma | H04L 41/0889 |
| 2017/0150621 A1* | 5/2017 | Breakstone | H05K 5/026 |

FOREIGN PATENT DOCUMENTS

| | | |
|---|---|---|
| CN | 103401811 A | 11/2013 |
| CN | 203313221 U | 11/2013 |
| CN | 105530556 A | 4/2016 |
| CN | 205563330 U | 9/2016 |

OTHER PUBLICATIONS

Chinese First Office Action and Written Opinion for related Chinese application No. 201780001510.2, dated Mar. 4, 2020 (12 pages).

\* cited by examiner

ETHERNET INTERCONNECTION CIRCUIT AND APPARATUS

CROSS-REFERENCE TO RELATED APPLICATION

The present application is a continuation-application of International (PCT) Patent Application No. PCT/CN2017/077767, filed on Mar. 22, 2017, the entire contents of which are hereby incorporated by reference in its entirety.

TECHNICAL FIELD

The present disclosure relates to the field of communications technologies, and in particular, to an Ethernet interconnect circuit and an apparatus.

BACKGROUND

For the current board-level design, when the board is required to include two main central processor units (CPUs) to communicate, a serial port, a serial peripheral interface (SPI), a universal serial bus (USB), a synchronous dynamic random access memory (synchronous DRAM, dual port dynamic random access memory (DPRAM)) or other interfaces are configured for a data intercommunication. However, the protocols have a master-slave concept. That is, if a slave-end CPU is configured to wait for the master-end CPU to send instructions when the slave-end CPU sending a data, the data could be returned to the master CPU through a response. If the slave-end CPU is configured to actively send data to the master-end CPU, the protocols are not supported.

For the serial port, RS485 or RS232 is usually used. An interconnection is achieved through a level conversion chip of RS485 or RS232. For an actual communication of the serial port, a side is required to be defined as a master station, and another side is defined as a slave station, thereby realizing the data intercommunication. For the SPI, there are four lines physically configured. The SPI is a full-duplex communication protocol. However, when a firmware program is required to be designed, a side is defined as a master station configured to control the entire communication process. For USB, the master-slave relationship is also required in a single communication process. Currently, a supported OTG mode can exchanger the master-slave relationship to facilitate the data intercommunication. However, the communication still needs a side to lead due to the master-slave relationship. For a communication between two CPUs achieved through the DPRAM scheme, another dual-port RAM chip is required to be arranged. For the interconnected data communication, a data synchronization over the DPRAM is required to be specially designed, such that errors from the data in an operation on both sides may be limited. A design difficulty is thus increased.

In summary, the above scheme has the following disadvantages.

The communication process is complicated. Currently, in terms of methods for achieving a board-level dual CPU communication through communication modes such as the SPI and the serial port, the data communication process is complicated.

A communication speed is slow. Currently, the communication speeds of the SPI and the serial port are relatively slow. The communication speed of the SPI is about 10M, and that of the serial port is about 1M.

An efficiency is low. For the master-slave communication mode, the slave station is required to wait for the master station to send instructions, such that the data may be sent though a feedback response. The slave station cannot send data actively, limiting the data communication efficiency.

A cost is high. When considering an external access to the internal two main CPUs, two CPUs are configured to provide channels, thereby increasing the cost of a hardware design.

SUMMARY OF THE DISCLOSURE

A technical solution according to the present disclosure is to provide an Ethernet interconnection circuit, including: a physical interface exchanger having a first physical interface, a second physical interface, and a third physical interface; a first board-level processor connected to the first physical interface; and a second board-level processor connected to the second physical interface.

A communication between the first board-level processor and an external Ethernet is implemented by the first board-level processor through the first physical interface, the third physical interface, and the network interface. A communication between the second board-level processor and the external Ethernet is implemented by the second board-level processor through the second physical interface, the third physical interface, and the network interface. A communication between the first board-level processor and the second board-level processor s implemented by the first board-level processor and the second board-level processor through the first physical interface and the second physical interface.

Alternatively, the third physical interface is a virtual physical interface.

Alternatively, the first physical interface comprises an medium independent interface (MIT) media access control (MAC) mode, an MII physical layer (PHY) mode, and an reduced medium independent interface (RMII) PHY mode; the second physical interface comprises an internal PHY mode, the MII MAC mode, the MII PHY mode, and the RMII PHY mode; the third physical interface comprises the internal PHY mode.

Alternatively, the first physical interface and the second physical interface are each configured in the MII PHY mode; the third physical interface is configured in the internal PHY mode.

Alternatively, the physical interface exchanger comprises modules: a port, a 10/100M physical address located at the port, a dynamic quality of service 4 queue connected to the 10/100M physical addresses, an exchanger engine, and a buffer manager; an end at the first board-level processor comprises an MIT data path; an end at the second board-level processor comprise an MII mux data path, an end at the external Ethernet comprises a 10/100M physical layer address.

An order of a communication path from the first board-level processor to the external Ethernet is: the MII data path, the 10/100M physical address of a port 0, the dynamic quality of service 4 queue, the exchanger engine, the buffer manager the dynamic quality of service 4 queue, the 10/100M physical address of a port 2, and the 10/100M physical layer address; an order of the communication path from the external Ethernet to the first board-level processor is reversed.

An order of a communication path from the second board-level processor to the external Ethernet is: the MII mux data path, the 10/100M physical address of a port 1, the dynamic quality of service 4 queue, the exchanger engine, the buffer manager, the dynamic quality of service 4 queue, the 10/100M physical address of the port 2, and the 10/100M physical layer address: an order of the communication path from the external Ethernet to the second board-level processor is reversed.

An order of a communication path from first board-level processor to the second board-level processor is: the MII data path, the 10/100M physical address of the port 0, the dynamic quality of service 4 queue, the exchanger engine, the buffer manager, the dynamic quality of service 4 queue, the 10/100M physical address of the port 1, and the MIT mux data path; an order of the communication path from the second board-level processor to the first board-level processor is reversed.

Alternatively, the first physical interface and the second physical interface respectively comprise a configuration pin; a configuration of the first physical interface and the second physical interface is performed by the configuration pin via pull-up and pull-down resistors during a power-on-reset process, respectively, such that the first physical interface and the second physical interface are respectively configured in the MIT PHY mode.

Alternatively, the configuration pins in the first physical interface and the second physical interface are further multiplexed into data transmission pins respectively after the power-on-reset process is completed.

Alternatively, the third physical interface is coupled to the network interface via a transformer; or the third physical interface is directly coupled to the network interface having an integrated transformer.

Alternatively, the physical interface exchanger comprises a phase-locked loop module coupled to an oscillator to provide a clock source for the physical interface exchanger.

Alternatively, the physical interface exchanger comprises an interrupt pin and a reset pin: the interrupt pin is connected with the first board-level processor and a general-purpose input/output (GPIO) pin in the second board-level processor. The reset pin is connected to a system reset pin.

Alternatively, the physical interface exchanger comprises a first test pin and a second test pin. When the Ethernet interconnection circuit works normally, the first test pin is connected to a power source, and the second test pin is grounded.

A technical solution according to the present disclosure is to provide an Ethernet interconnection circuit, including: a physical interface exchanger having a first physical interface, a second physical interface, and a third physical interface; a first board-level processor connected to the first physical interface; and a second board-level processor connected to the second physical interface; wherein the third physical interface is connected to a network interface.

A first communication path is formed between the first board-level processor and an external Ethernet, and the first communication path passes through the first physical interface, the third physical interface, and the network interface: a second communication path is formed between the second board-level processor and the external Ethernet, and the second communication path passes through the second physical interface, the third physical interface, and the network interface: a third communication path is formed between the first board-level processor and the second board-level processor, and the third communication path passes through the first physical interface and the second physical interface.

Alternatively, the physical interface exchanger comprises modules: a port, a 10/100M physical address located at the port, a dynamic quality of service 4 queue connected to the 10/100M physical addresses, an exchanger engine, and a buffer manager; an end at the first board-level processor comprises an MII data path; an end at the second board-level processor comprise an MII mux data path; an end at the external Ethernet comprises a 10/100M physical layer address.

Alternatively, the physical interface exchanger comprises an interrupt pin and a reset pin; the interrupt pin is connected to the first board-level processor and a general-purpose input/output (GPIO) pin in the second board-level processor; the reset pin is connected to a system reset pin.

A technical solution according to the present disclosure is to provide an Ethernet interconnection apparatus, including: an Ethernet interconnection circuit and a network interface. The Ethernet interconnection circuit includes a physical interface exchanger having a first physical interface, a second physical interface, and a third physical interface; a first board-level processor connected to the first physical interface; and a second board-level processor connected to the second physical interface. The network interface is connected to the third physical interface.

A communication between the first board-level processor and an external Ethernet is implemented by the first board-level processor through the first physical interface, the third physical interface, and the network interface. A communication between the second board-level processor and the external Ethernet is implemented by the second board-level processor through the second physical interface, the third physical interface, and the network interface. A communication between the first board-level processor and the second board-level processor is implemented by the first board-level processor and the second board-level processor through the first physical interface and the second physical interface.

Alternatively, the first physical interface comprises an medium independent interface (MII) media access control (MAC) mode, an MII physical layer (PHY) mode, and a reduced medium independent interface (RMII) PHY mode; the second physical interface comprises an internal PHY mode, the MII MAC mode, the MII PHY mode, and the RMII PHY mode; the third physical interface comprises the internal PHY mode.

Alternatively, the first physical interface and the second physical interface respectively comprise a configuration pin; a configuration of the first physical interface and the second physical interface is performed by the configuration pin via pull-up and pull-down resistors during a power-on-reset process, respectively, such that the first physical interface and the second physical interface are respectively configured in the MII PHY mode.

Alternatively, the configuration pins in the first physical interface and the second physical interface are further multiplexed into data transmission pins respectively after the power-on-reset process is completed.

BRIEF DESCRIPTION OF THE DRAWINGS

To further illustrate technical solutions of embodiments of the present disclosure drawings needed for description of the embodiments will be briefly introduced. Obviously, the following drawings are only some embodiments of the present disclosure. To any one of skill in the art, other drawings may be obtained without any creative work based on the following drawings.

DETAILED DESCRIPTION

The technical solutions in the embodiments of the present disclosure are clearly and completely described in the following with reference to the accompanying drawings in the embodiments of the present disclosure. It is obvious that the described embodiments are only a part of the embodiments of the present disclosure, and not all embodiments. All other embodiments obtained by those skilled in the art based on the embodiments of the present disclosure without creative efforts are within the scope of the present disclosure.

Figure 1:
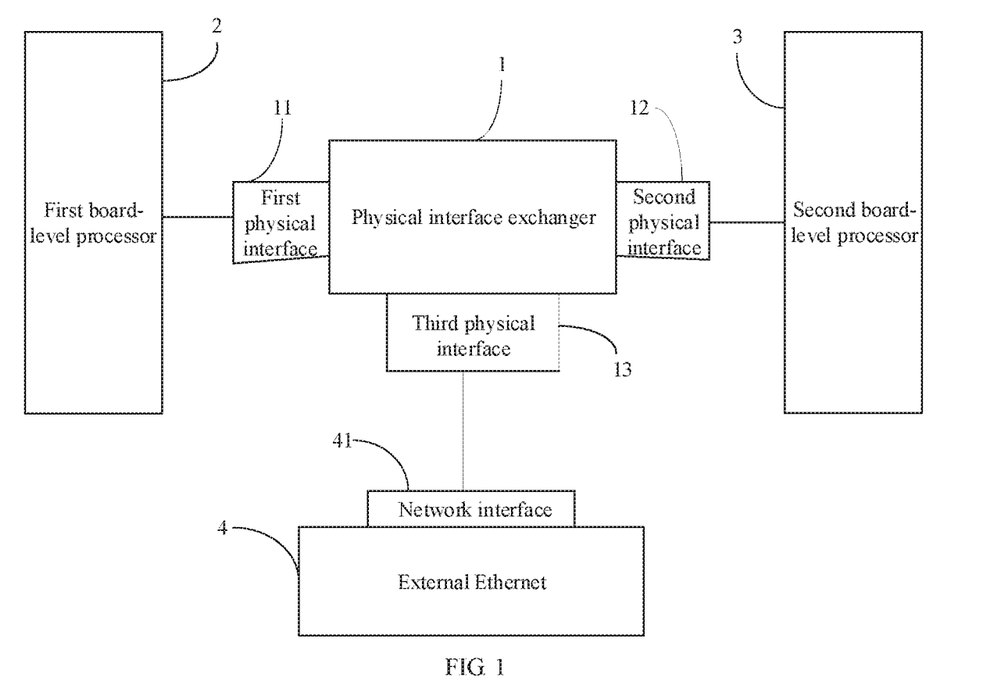
FIG. 1 is a schematic structural view of an Ethernet interconnection circuit according to an embodiment of the present disclosure.

Referring to FIG. 1, FIG. 1 is a schematic structural view of an Ethernet interconnection circuit according to an embodiment of the present disclosure. The circuit may include: a physical interface exchanger 1, a first board-level processor 2, and a second board-level processor 3.

The physical interface exchanger 1 includes a first physical interface 11, a second physical interface 12, and a third physical interface 13. The first board-level processor 2 is connected to the first physical interface 11 of the physical interface exchanger 1. The second board-level processor 3 is connected to the second physical interface 12 of the physical interface exchanger 1.

The third physical interface 13 of the physical interface exchanger 1 is connected to a network interface 41.

A communication between the first board-level processor 2 and an external Ethernet 4 may be implemented by the first board-level processor 2 via the first physical interface 11, the third physical interface 13 in the physical interface exchanger 1, and the network interface 41 connected to the third physical interface 13. A communication between the second board-level processor 3 and the external Ethernet 4 may be implemented by the second board-level processor 3 via the second physical interface 12, the third physical interface 13 in the physical interface exchanger 1, and the network interface 41 connected to the third physical interface 13. A communication between the first board-level processor 2 and the second board-level processor 3 may be implemented by the first board-level processor 2 and the second board-level processor 3 via the first physical interface 11 and the second physical interface 12 in the physical interface exchanger 1.

According to the embodiment of the present disclosure, the physical interface exchanger includes a first physical interface, a second physical interface, and a third physical interface. A communication between the first board-level processor and the external Ethernet may be implemented by the first board-level processor via the first physical interface, the third physical interface, and the network interface connected to the third physical interface. A communication between the second board-level processor and the external Ethernet may be implemented by the second board-level processor via the second physical interface, the third physical interface, and the network interface connected to the third physical interface. A communication between the first board-level processor and the second board-level processor may be implemented by the first board-level processor and the second board-level processor via the first physical interface and the second physical interface. Since the physical interface exchanger is configured to perform the communication of two CPUs, a communication process is simple and easy to be designed. For a data communication hardware, a 100 Mbps communication cable is configured to support a high-speed data transmission, such that the communication speed is high. A multi-master communication mode is configured to transmit the data in a large-scale and fast, increasing the efficiency. The data may be sent directly to each other without waiting for the operation of the master station. Only one physical interface exchanger is configured, implementing functions previously requiring multiple circuit modules, such that the cost of the board is greatly reduced.

The third physical interface 13 is a virtual physical interface.

The first physical interface 11 includes an MII MAC mode, an MII PHY mode, and an RMII PHY mode. The second physical interface 12 includes an internal PHY mode, an MIT MAC mode, an MII PHY mode, and an RMII PHY mode. The third physical interface 13 includes an internal PHY mode.

The MII is an abbreviation of medium independent interface, which is generally applied to an Ethernet data transmission between the MAC layer and the PHY layer, and may also be called as a data interface. The RMII, referring to a reduced MII, is a simplified board for the MIT The MAC is an abbreviation of media access control. The PHY is an abbreviation of physical layer.

For the first board-level processor 2 and the second board-level processor 3, a MAC peripheral is arranged in the chip itself. The physical interface exchanger 1 is connected to the MII interface to provide a network port. The MII interface mainly includes: a transmitting data interface from the MAC layer to the physical layer, a receiving data interface from the physical layer to the MAC layer, a status indication signal from the physical layer to the MAC layer, and a management data input/output (MDIO) interface between the MAC layer and the physical layer transferring a controlling information and a status information. Correspondingly, in order to adapt to various applications, the first physical interface 11 may work in the MII MAC mode, the MII PHY mode, and the RMI PHY mode, respectively. The second physical interface 12 may work in the internal PHY mode, the MII MAC mode, the MII PHY mode and the RMII PHY mode, respectively. The third physical interface 13 may work in the internal PHY mode.

The different working modes of the first physical interface 11 and the second physical interface 12 in the physical interface exchanger 1 are implemented by configuration pins of the first physical interface 11 and the second physical interface 12.

In an embodiment, the first physical interface 11 and the second physical interface 12 are each configured in the MII PHY mode. The third physical interface works in the internal PHY mode.

Figure 2:
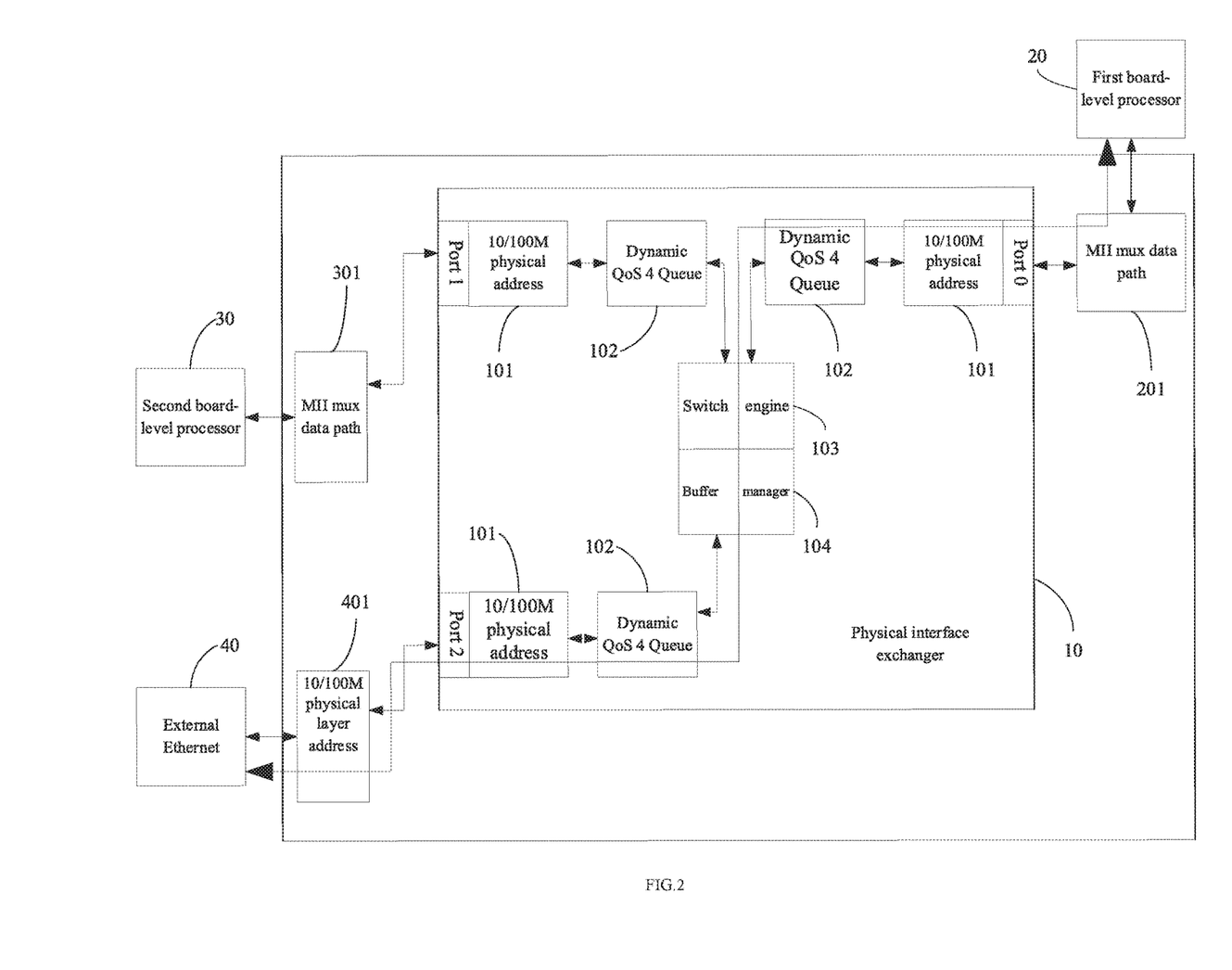
FIG. 2 is a schematic view of a principle of a first board-level processor implementing a function communicating with an external Ethernet through a physical interface exchanger.
Figure 3:
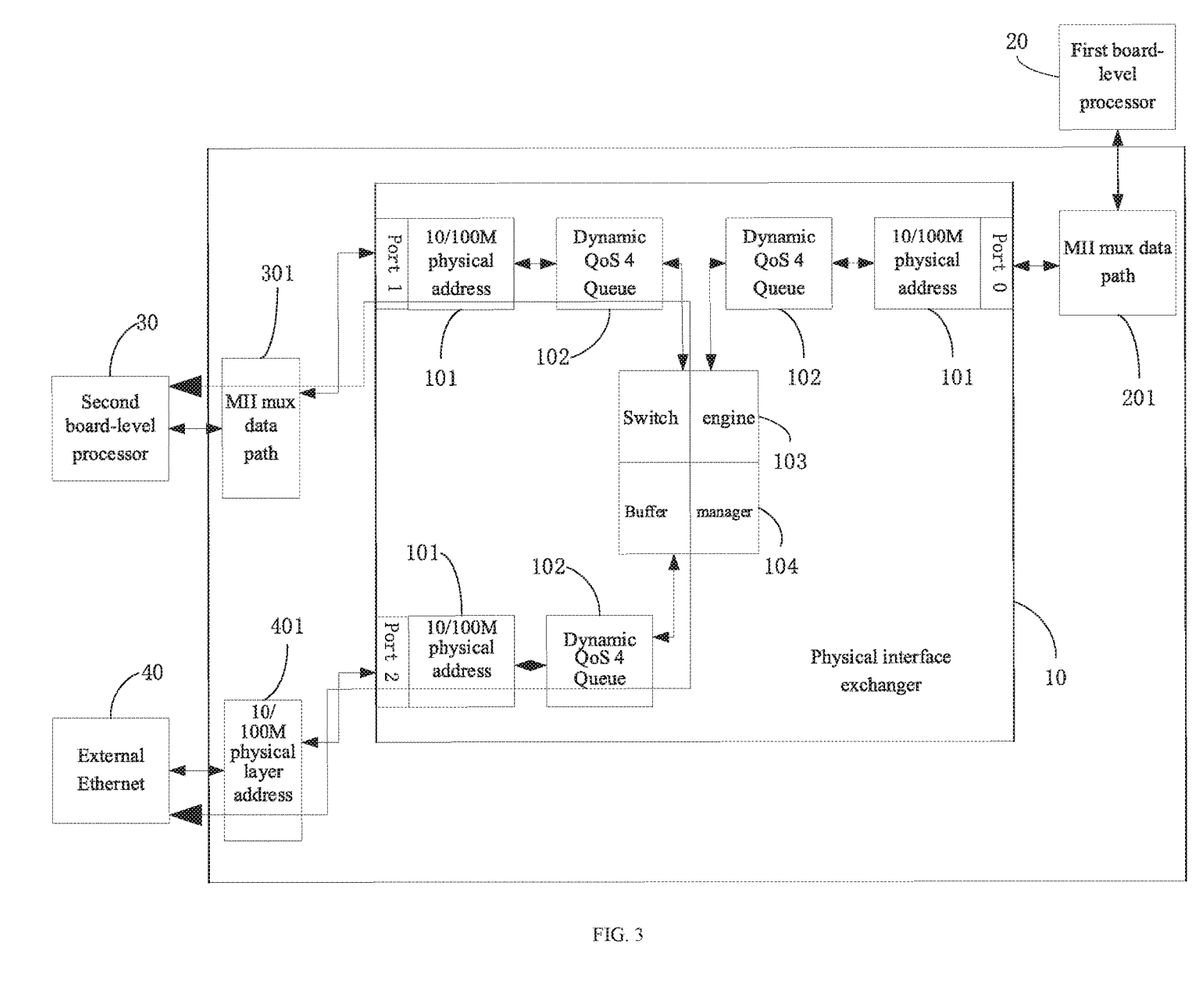
FIG. 3 is a schematic view of a principle of a second board-level processor implementing a function of communicating with an external Ethernet through a physical interface exchanger.
Figure 4:
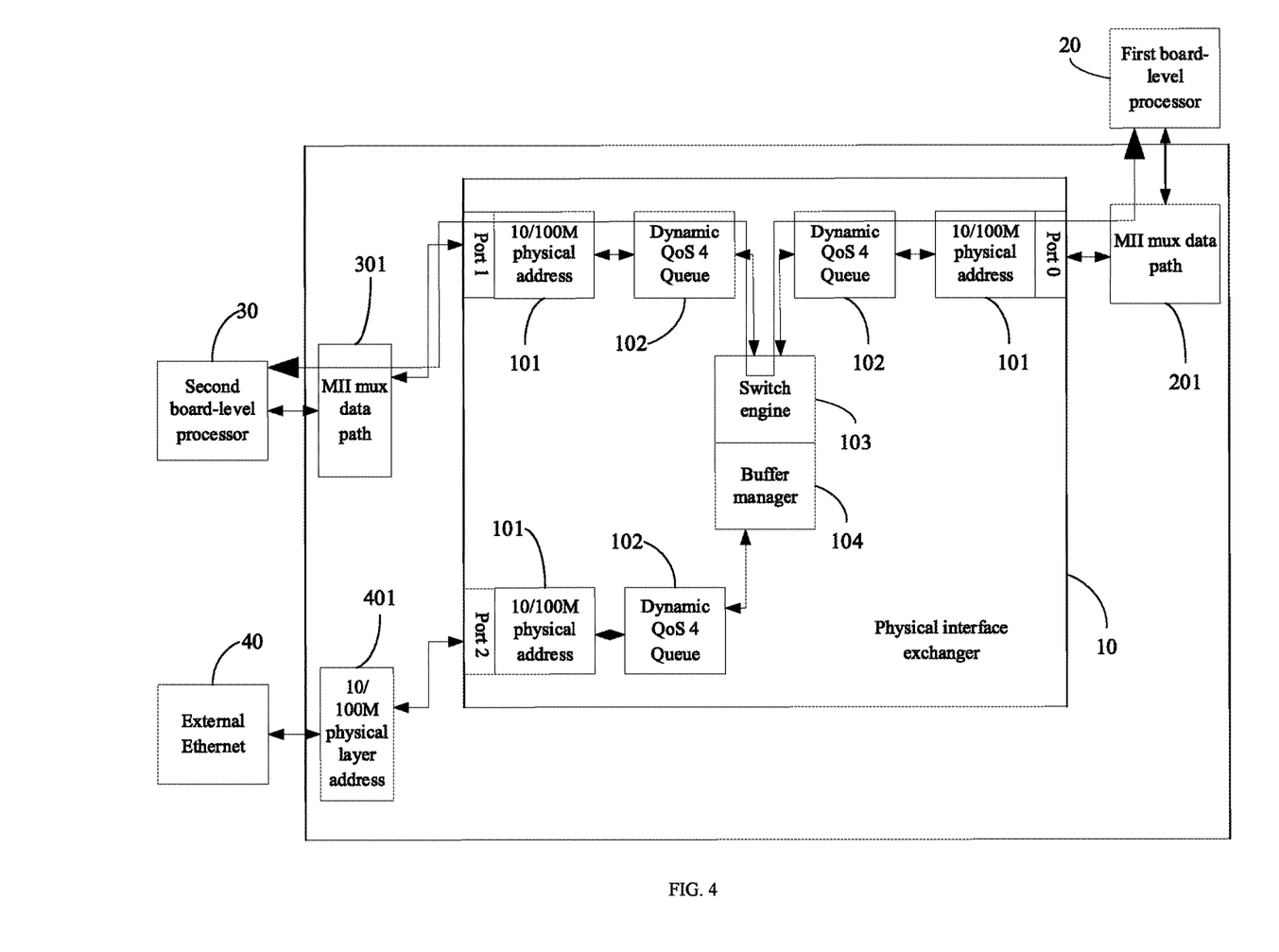
FIG. 4 is a schematic view of a principle of a first board-level processor and a second board-level processor implementing an Ethernet communication function between the first board-level processor and the second board-level processor through a physical interface exchanger.

Referring to FIG. 2 to FIG. 4, FIG. 2 is a schematic view of a principle of a first board-level processor implementing a function communicating with an external Ethernet through a physical interface exchanger. FIG. 3 is a schematic view of a principle of a second board-level processor implementing a function of communicating with an external Ethernet through a physical interface exchanger. FIG. 4 is a schematic view of a principle of a first board-level processor and a second board-level processor implementing an Ethernet communication function between the first board-level processor and the second board-level processor through a physical interface exchanger.

The physical interface exchanger 10 includes the following modules: three 10/100M physical addresses 101 (10/100 MAC) located at a port 0, a port 1, and a port 2, three dynamic quality of service 4 queues 102 (Dynamic QoS 4 Queues) respectively connected to the 10/100M physical addresses 101, an exchanger engine 103, and a buffer manager 104. A first board-level processor 20 end includes a MI data path 201. A second board-level processor 30 end includes a MII mux data path 301. The external Ethernet 40 end includes a 10/100M physical layer address 401 (10/100 PHY).

Referring to FIG. 2, the function communicating with the external Ethernet 40 is implemented by the first board-level processor 20 through the physical interface exchanger 10. A communication path for the function is illustrated in FIG. 2 as a black line with thick arrows at both ends. An order of the communication path from the first board-level processor 20 to the external Ethernet 40 is: the MII data path 201, the 10/100M physical address 101 of a port 0, the dynamic quality of service 4 queue 102, the exchanger engine 103, the buffer manager 104, the dynamic quality of service 4 queue 102, the 10/100M physical address 101 of a port 2, and the 10/100M physical layer address 401. An order of the communication path from the external Ethernet 40 to the first board-level processor 20 is reversed.

Referring to FIG. 3, the function communicating with the external Ethernet 40 is implemented by the second board-level processor 30 through the physical interface exchanger 10. A communication path for the function is illustrated in FIG. 3 as a black line with thick arrows at both ends. An order of the communication path from the second board-level processor 30 to the external Ethernet 40 is: the MII mux data path 301, the 10/100M physical address 101 of the port 1, the dynamic quality of service 4 queue 102, the exchanger engine 103, the buffer manager 104, the dynamic quality of service 4 queue 102, the 10/100M physical address 101 of the port 2, and the 10/100M physical layer address 401. An order of the communication path from the external Ethernet 40 to the second board-level processor 30 is reversed.

Referring to FIG. 4, the Ethernet communication function between the first board-level processor 20 and the second board-level processor 30 is implemented by the first board-level processor 20 and the second board-level processor 30 through the physical interface exchanger 10. A communication path for the function is illustrated in FIG. 4 as a black line with thick arrows at both ends. An order of the communication path from the first board-level processor 20 to the second board-level processor 30 is: the MII data path 201, the 10/100M physical address 101 of the port 0, the dynamic quality of service 4 queue 102, the exchanger engine 103, the buffer manager 104, the dynamic quality of service 4 queue 102, the 10/100M physical address 101 of the port 1, and the MII mux data path 301. An order of the communication path from the second board-level processor 30 to the first board-level processor 20 is reversed.

In an embodiment, the first physical interface 11 and the second physical interface 12 respectively include a configuration pin. A configuration of the first physical interface 11 and the second physical interface 12 is performed by the configuration pin via pull-up and pull-down resistors during a power-on-reset process, respectively. Such that the first physical interface 11 and the second physical interface 12 are respectively configured in the MII PHY mode.

Further, after the power-on-reset process is completed, the configuration pin in the first physical interface 11 and the second physical interface 12 is further multiplexed into a data transmission pin, respectively. In this way, an amount of pins may be reduced, thereby simplifying a structure of the first physical interface 11 and the second physical interface 12.

In an embodiment, the third physical interface 13 is connected to the network interface 41 via a transformer. In another embodiment, the third physical interface 13 is directly connected to the network interface 41 with an integrated transformer. For example: a registered jack 45 (RJ45) network interface with an integrated transformer.

In an embodiment, the physical interface exchanger 1 further includes a phase-locked loop module coupled to an oscillator to provide a clock source for the physical interface exchanger 1. In this way, a stable clock signal may be provided to the physical interface exchanger 1.

In an embodiment, the physical interface exchanger 1 further includes an interrupt pin and a reset pin. The interrupt pin is connected to a general-purpose input/output (GPIO) pin in the first board-level processor 2 and the second board-level processor 3.

The physical interface exchanger 1 further includes a first test pin and a second test pin. When the circuit works normally, the first test pin is connected to a power source, and the second test pin is grounded.

Figure 5:
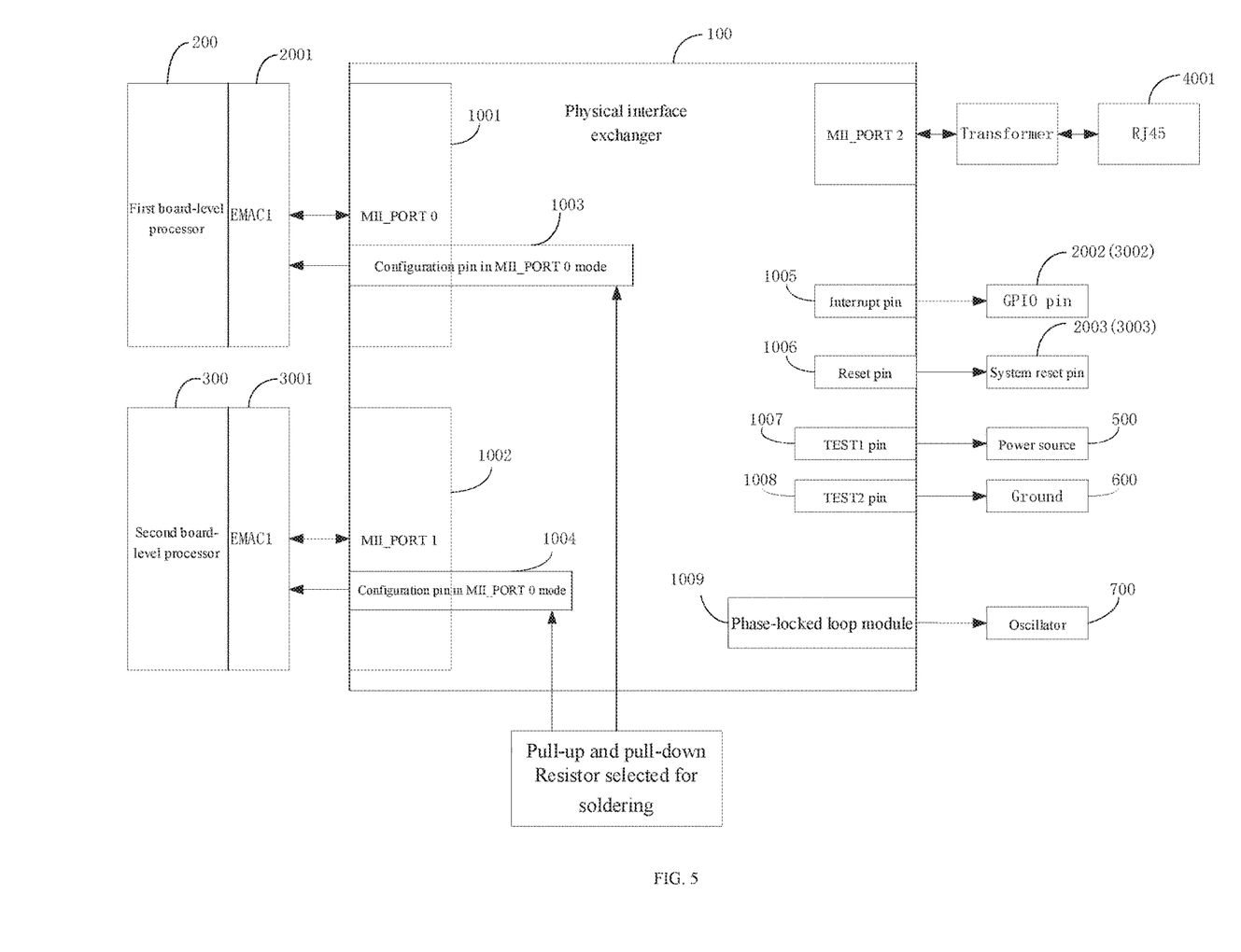
FIG. 5 is a schematic view of a connection principle of the first board-level processor, the second board-level processor, and the physical interface exchanger according to an embodiment of the present disclosure.

Referring to FIG. 5, FIG. 5 is a schematic view of a connection principle of the first board-level processor, the second board-level processor, and the physical interface exchanger according to an embodiment of the present disclosure.

An Ethernet media access control 1 (EMAC1) 2001 of a first board-level processor 200 is connected to an MII_PORT 0 interface 1001 of a physical interface exchanger 100. An EMAC1 3001 of a second board-level processor 300 is connected to an MII_PORT 1 interface 1002 of the physical interface exchanger 100. A Port 0 and a port 1 are configured to work in the MII PHY mode. The configuration is performed through a configuration pin of the respective ports. A configuration pin 1003 and 1004 are multiplexed with a data transmission pin of the physical interface exchanger 100. A reading (inputting) of configuration modes is performed only during the power-on-reset process. The configuration pin is configured (output) as a data transmission pin after the power-on-reset is completed. The configuration is performed via pull-up and pull-down resistors. The pull-up and pull-down resistors are selected for soldering. For example, an RJ45 interface 4001 of an integrated transformer is selected as an Ethernet interface. An initial configuration and a management of the physical interface exchanger 100 may be through an I2C interface or an SMI (MDIO) mode. In a first version of a design, the two modes may be reserved at the same time. A register of the physical interface exchanger 100 may be operated in any mode by changing the configuration pin. An interrupt pin 1005 of the physical interface exchanger 100 is connected to a GPIO pins 2002, 3002 of the first board-level processor 200 and the second board-level processor 300. A reset pin 1006 is connected to a system reset pin 2003, 3003. In a normal operation, a first test pin (TEST1 pin) 1007 is required to be connected to a power source 500 through a pull-up resistor. The second test pin (TEST2 pin) 1008 is required to be grounded 600. In addition, a phase-locked loop module 1009 of the physical interface exchanger 100 is externally connected to a 25 MHz crystal oscillator 700 as a clock source.

In an embodiment, the physical interface exchanger 100 also includes a specific light emitting diode (LED) control pin to control the LEDs of the RJ45 interface 4001, and an LED indicator to indicate the current full-duplex or half-duplex operation.

Figure 6:
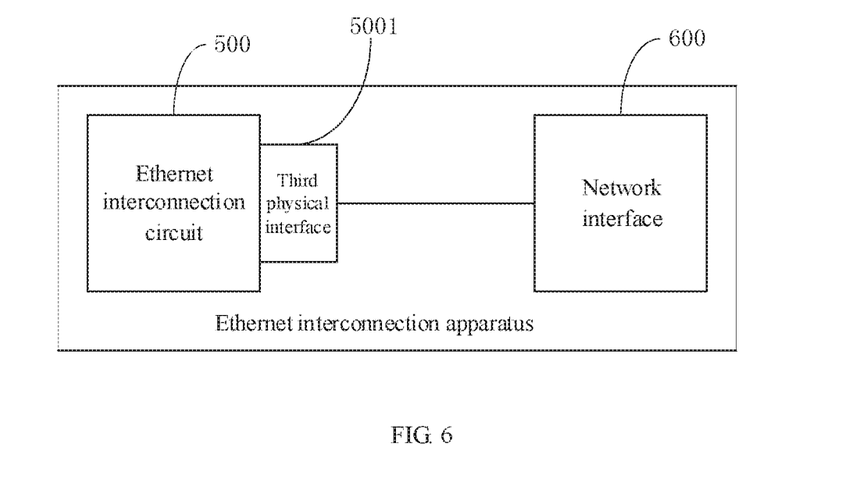
FIG. 6 is a schematic structural view of an Ethernet interconnection apparatus according to an embodiment of the present disclosure.

Referring to FIG. 6, FIG. 6 is a schematic structural view of an Ethernet interconnection apparatus according to an embodiment of the present disclosure. The apparatus may include: an Ethernet interconnection circuit 500 and a network interface 600. The Ethernet interconnection circuit 500 is any one of the circuits as described above. A detailed description is with reference to the above circuit section, which will not be described here. The network interface 600 is connected to a third physical interface 5001.

The above description is only the embodiment of the present disclosure, and is not intended to limit the scope of the invention. The equivalent structure or equivalent process transformation using the specification and the drawings of the present disclosure may be directly or indirectly applied to other related technologies. The fields are all included in the scope of patent protection of the present disclosure.

What is claimed is:

1. An Ethernet interconnection circuit, comprising:
a physical interface exchanger having a first physical interface, a second physical interface, and a third physical interface;
a first board-level processor connected to the first physical interface; and
a second board-level processor connected to the second physical interface;
wherein the third physical interface is connected to a network interface;
a communication between the first board-level processor and an external Ethernet is implemented by the first board-level processor through the first physical interface, the third physical interface, and the network interface;
a communication between the second board-level processor and the external Ethernet is implemented by the second board-level processor through the second physical interface, the third physical interface, and the network interface;
a communication between the first board-level processor and the second board-level processor is implemented by the first board-level processor and the second board-level processor through the first physical interface and the second physical interface;
wherein the third physical interface is a virtual physical interface; the first physical interface comprises a medium independent interface (MII) media access control (MAC) mode, an MII physical layer (PHY) mode, and a reduced medium independent interface (RMI) PHY mode; the second physical interface comprises an internal PHY mode, the MII MAC mode, the MII PHY mode, and the RMII PHY mode; the third physical interface comprises the internal PHY mode.

2. The Ethernet interconnection circuit according to claim 1, wherein the first physical interface and the second physical interface are each configured in the MII PHY mode the third physical interface is configured in the internal PHY mode.

3. The Ethernet interconnection circuit according to claim 2, wherein the physical interface exchanger comprises modules: a port, a 10/100M physical address located at the port, a dynamic quality of service queue connected to the 10/100M physical addresses, an exchanger engine, and a buffer manager; an end at the first board-level processor comprises an MII data path; an end at the second board-level processor comprises an MII mux data path; an end at the external Ethernet comprises a 10/100M physical layer address;
an order of a communication path from the first board-level processor to the external Ethernet is: the MII data path, the 10/100M physical address of a port 0, the dynamic quality of service 4 queue, the exchanger engine, the buffer manager the dynamic quality of service 4 queue, the 10/100M physical address of a port 2, and the 10/100M physical layer address; an order of the communication path from the external Ethernet to the first board-level processor is reversed.

4. The Ethernet interconnection circuit according to claim 3, an order of a communication path from the second board-level processor to the external Ethernet is: the MII mux data path, the 10/100M physical address of a port 1, the dynamic quality of service 4 queue, the exchanger engine, the buffer manager, the dynamic quality of service 4 queue, the 10/100M physical address of the port 2, and the 10/100M physical layer address; an order of the communication path from the external Ethernet to the second board-level processor is reversed.

5. The Ethernet interconnection circuit according to claim 4, an order of a communication path from first board-level processor to the second board-level processor is: the MII data path, the 10/100M physical address of the port 0, the dynamic quality of service 4 queue, the exchanger engine, the buffer manager, the dynamic quality of service 4 queue, the 10/100M physical address of the port 1, and the mux data path; an order of the communication path from the second board-level processor to the first board-level processor is reversed.

6. The Ethernet interconnection circuit according to claim 2, wherein the first physical interface and the second physical interface respectively comprise a configuration pin; a configuration of the first physical interface and the second physical interface is performed by the configuration pin via pull-up and pull-down resistors during a power-on-reset process, respectively, such that the first physical interface and the second physical interface are respectively configured in the MII PHY mode.

7. The Ethernet interconnection circuit according to claim 6, wherein the configuration pin in the first physical interface and the configuration pin in the second physical interface are further multiplexed into data transmission pins respectively after the power-on-reset process is completed.

8. The Ethernet interconnection circuit according to claim 1, wherein the third physical interface is coupled to the network interface via a transformer: or the third physical interface is directly coupled to the network interface having an integrated transformer.

9. The Ethernet interconnection circuit according to claim 1, wherein the physical interface exchanger comprises a phase-locked loop module coupled to an oscillator to provide a clock source for the physical interface exchanger.

10. The Ethernet interconnection circuit according to claim 1, wherein the physical interface exchanger comprises an interrupt pin and a reset pin; the interrupt pin is connected to the first board-level processor and a general-purpose input/output (GPIO) pin in the second board-level processor; the reset pin is connected to a system reset pin.

11. The Ethernet interconnection circuit according to claim 1, wherein the physical interface exchanger comprises a first test pin and a second test pin: when the Ethernet interconnection circuit works normally, the first test pin is connected to a power source, and the second test pin is grounded.

12. An Ethernet interconnection circuit, comprising:
a physical interface exchanger having a first physical interface, a second physical interface, and a third physical interface;
a first board-level processor connected to the first physical interface; and
a second board-level processor connected to the second physical interface;
wherein the third physical interface is connected to a network interface;
wherein a first communication path is formed between the first board-level processor and an external Ethernet, and the first communication path passes through the first physical interface, the third physical interface, and the network interface;
a second communication path is formed between the second board-level processor and the external Ethernet, and the second communication path passes through the second physical interface, the third physical interface, and the network interface;
a third communication path is formed between the first board-level processor and the second board-level processor, and the third communication path passes through the first physical interface and the second physical interface;
wherein the physical interface exchanger comprises modules: a port, a 10/100M physical address located at the port, a dynamic quality of service 4 queue connected to the 10/100M physical addresses, an exchanger engine, and a buffer manager; an end at the first board-level processor comprises an MII data path; an end at the second board-level processor comprises an MII mux data path: an end at the external Ethernet comprises a 10/100M physical layer address.

13. The Ethernet interconnection circuit according to claim 12, wherein the physical interface exchanger comprises an interrupt pin and a reset pin; the interrupt pin is connected to the first board-level processor and a general-purpose input/output (MO) pin in the second board-level processor; the reset pin is connected to a system reset pin.

14. An Ethernet interconnection apparatus, comprising:
an Ethernet interconnection circuit, comprising:
a physical interface exchanger having a first physical interface, a second physical interface, and a third physical interface;
a first board-level processor connected to the first physical interface; and
a second board-level processor connected to the second physical interface; and
a network interface connected to the third physical interface: wherein,
a communication between the first board-level processor and an external Ethernet is implemented by the first board-level processor through the first physical interface, the third physical interface, and the network interface;
a communication between the second board-level processor and the external Ethernet is implemented by the second board-level processor through the second physical interface, the third physical interface, and the network interface;
a communication between the first board-level processor and the second board-level processor is implemented by the first board-level processor and the second board-level processor through the first physical interface and the second physical interface;
wherein the first physical interface comprises a medium independent interface (MII) media access control (MAC) mode, an MII physical layer (PHY) mode, and a reduced medium independent interface (RMI) PRY mode; the second physical interface comprises an internal PHY mode, the MII MAC mode, the MII PHY mode, and the RMII PHY mode; the third physical interface comprises the internal PHY mode.

15. The Ethernet interconnection apparatus according to claim 14, wherein the first physical interface and the second physical interface respectively comprise a configuration pin; a configuration of the first physical interface and the second physical interface is performed by the configuration pin via pull-up and pull-down resistors during a power-on-reset process, respectively, such that the first physical interface and the second physical interface are respectively configured in the MII PHY mode.

16. The Ethernet interconnection apparatus according to claim 15, wherein the configuration pins in the first physical interface and the second physical interface are further multiplexed into data transmission pins respectively after the power-on-reset process is completed.

* * * * *